(12) United States Patent
Wu

(10) Patent No.: US 9,155,346 B2
(45) Date of Patent: Oct. 13, 2015

(54) PROCESS FOR REFLECTIVE PRODUCTS

(71) Applicant: CING WAI KUNG MAU COMPANY, Jiaoxi Township (TW)

(72) Inventor: Chien Min Wu, Jiaoxi Township (TW)

(73) Assignee: Cing Wai Kung Mau Company, Jiaoxi Township (TW)

( * ) Notice: Subject to any disclaimer, the term of this patent is extended or adjusted under 35 U.S.C. 154(b) by 111 days.

(21) Appl. No.: 14/053,711

(22) Filed: Oct. 15, 2013

(65) Prior Publication Data
US 2014/0110043 A1 Apr. 24, 2014

(30) Foreign Application Priority Data

Oct. 18, 2012 (TW) .............................. 101138502 A

(51) Int. Cl.
| | |
|---|---|
| B44C 1/17 | (2006.01) |
| B29C 65/48 | (2006.01) |
| B32B 37/24 | (2006.01) |
| B32B 37/26 | (2006.01) |
| B32B 38/10 | (2006.01) |
| B32B 38/14 | (2006.01) |
| B32B 43/00 | (2006.01) |
| A41H 43/00 | (2006.01) |
| D06M 23/00 | (2006.01) |
| G02B 5/128 | (2006.01) |

(52) U.S. Cl.
CPC ............... *A41H 43/00* (2013.01); *D06M 23/00* (2013.01); *G02B 5/128* (2013.01)

(58) Field of Classification Search
USPC .......... 156/230, 234, 239, 240, 241, 247, 249
See application file for complete search history.

(56) References Cited

U.S. PATENT DOCUMENTS

| | | | | |
|---|---|---|---|---|
| 2,422,256 | A * | 6/1947 | Phillippi | 40/615 |
| 3,614,199 | A * | 10/1971 | Altman | 359/540 |
| 3,758,192 | A * | 9/1973 | Bingham | 359/538 |
| 3,801,183 | A * | 4/1974 | Sevelin et al. | 359/537 |

(Continued)

FOREIGN PATENT DOCUMENTS

| | | |
|---|---|---|
| CN | 1094737 A | 11/1994 |
| CN | 1350649 A | 5/2002 |

(Continued)

OTHER PUBLICATIONS

Non-English Notice of Reasons for Rejection dated Dec. 1, 2014 for Japanese Application No. 2013-216148 with English translation.

(Continued)

*Primary Examiner* — Sing P Chan
(74) *Attorney, Agent, or Firm* — Ladas & Parry LLP

(57) ABSTRACT

The subject invention is related to a method for preparing a reflective film, comprising the steps of: (a) providing a first substrate and forming a releasable adhesive layer thereon; (b) applying reflective particles onto the releasable adhesive layer, where the reflective particles are partially embedded in the releasable adhesive layer; (c) applying a pigment onto the reflective particles and the releasable adhesive layer; (d) removing part of the pigment so that the pigment does not completely cover the reflective particles; and (d) forming a reflective layer on the pigment and the reflective particles. The invention further pertains to a method for manufacturing a reflective article by using the reflective film prepared according to the above-mentioned method.

9 Claims, 1 Drawing Sheet

(56) References Cited

U.S. PATENT DOCUMENTS

| | | | | |
|---|---|---|---|---|
| 3,877,786 | A | * | 4/1975 | Booras et al. ............... 359/539 |
| 4,153,412 | A | * | 5/1979 | Bailey ............................ 8/471 |
| 4,605,461 | A | * | 8/1986 | Ogi ............................... 156/233 |
| 4,678,695 | A | * | 7/1987 | Tung et al. .................... 428/120 |
| 4,763,985 | A | * | 8/1988 | Bingham ...................... 359/518 |
| 4,937,127 | A | * | 6/1990 | Haenggi et al. ............... 428/148 |
| 5,053,253 | A | * | 10/1991 | Haenggi et al. ............... 427/204 |
| 5,094,902 | A | * | 3/1992 | Haenggi et al. ............... 428/150 |
| 5,124,178 | A | * | 6/1992 | Haenggi et al. ............... 427/204 |
| 5,338,595 | A | * | 8/1994 | Li .................................. 428/143 |
| 5,344,705 | A | * | 9/1994 | Olsen ........................ 428/32.71 |
| 5,451,447 | A | * | 9/1995 | Li .................................. 428/143 |
| 5,503,906 | A | * | 4/1996 | Olsen ........................ 428/32.71 |
| 5,620,613 | A | * | 4/1997 | Olsen ............................ 216/24 |
| 5,631,064 | A | * | 5/1997 | Marecki ........................ 428/143 |
| 5,645,938 | A | * | 7/1997 | Crandall ...................... 428/411.1 |
| 5,674,605 | A | * | 10/1997 | Marecki ........................ 428/325 |
| 5,738,746 | A | * | 4/1998 | Billingsley et al. ........... 156/239 |
| 5,812,317 | A | * | 9/1998 | Billingsley et al. ........... 359/536 |
| 5,822,119 | A | * | 10/1998 | Rasmussen et al. .......... 359/515 |
| 5,837,347 | A | * | 11/1998 | Marecki ........................ 428/143 |
| 5,916,399 | A | * | 6/1999 | Olsen ............................ 156/230 |
| 5,962,121 | A | * | 10/1999 | Mori ............................. 428/323 |
| 5,976,669 | A | * | 11/1999 | Fleming ....................... 428/143 |
| 6,059,915 | A | * | 5/2000 | Lightle et al. ................ 156/238 |
| 6,060,157 | A | * | 5/2000 | LaPerre et al. ............... 428/325 |
| 6,066,384 | A | * | 5/2000 | Crandall ....................... 428/325 |
| 6,110,558 | A | * | 8/2000 | Billingsley et al. ............ 428/67 |
| 6,127,020 | A | * | 10/2000 | Bacon et al. ................. 428/161 |
| 6,153,128 | A | * | 11/2000 | Lightle et al. ................ 264/1.9 |
| 6,306,459 | B1 | * | 10/2001 | Fleming ....................... 427/163.4 |
| 6,326,053 | B1 | * | 12/2001 | Stump et al. ................. 427/163.4 |
| 6,355,302 | B1 | * | 3/2002 | Vandenberg et al. ....... 427/163.4 |
| 6,361,850 | B1 | * | 3/2002 | Billingsley et al. ........... 428/143 |
| 6,416,856 | B1 | * | 7/2002 | Crandall ....................... 428/325 |
| 6,451,408 | B1 | * | 9/2002 | Haunschild et al. .......... 428/143 |
| 6,966,660 | B1 | * | 11/2005 | Buccellato et al. ........... 359/540 |
| 7,111,949 | B2 | * | 9/2006 | Parisi et al. ................... 359/536 |
| 7,140,741 | B2 | * | 11/2006 | Fleming et al. .............. 359/536 |
| 8,496,340 | B2 | * | 7/2013 | Budd et al. .................... 359/536 |
| 2002/0090492 | A1 | * | 7/2002 | Haunschild et al. .......... 428/141 |
| 2010/0055374 | A1 | * | 3/2010 | Greer et al. ................... 428/64.1 |
| 2010/0124632 | A1 | | 5/2010 | Hannington |
| 2010/0302639 | A1 | * | 12/2010 | Budd et al. .................... 359/542 |
| 2011/0059295 | A1 | * | 3/2011 | Greer et al. ................... 428/149 |
| 2011/0292507 | A1 | * | 12/2011 | Hsu ............................... 359/538 |
| 2011/0292508 | A1 | | 12/2011 | Huang et al. |
| 2012/0218653 | A1 | * | 8/2012 | Liu et al. ...................... 359/868 |
| 2013/0108784 | A1 | * | 5/2013 | Koppes et al. ............. 427/163.4 |
| 2014/0022641 | A1 | * | 1/2014 | Yoon, Se Won ............. 359/538 |

FOREIGN PATENT DOCUMENTS

| | | |
|---|---|---|
| CN | 102282483 A | 12/2011 |
| CN | 102692660 A | 9/2012 |
| JP | 9-506301 A | 6/1997 |
| JP | 11-512494 A | 10/1999 |
| JP | 2003-502706 A | 1/2003 |
| JP | 2003-181869 A | 7/2003 |
| JP | 2004-252117 A | 9/2004 |
| JP | 2005-173417 A | 6/2005 |
| JP | 2011-206655 A | 10/2011 |
| KR | 10-2008-0065714 | 7/2008 |
| TW | 396111 | 7/2000 |
| TW | 566338 | 12/2003 |
| TW | 583414 B | 4/2004 |
| WO | 95/14248 A2 | 5/1995 |
| WO | 97/10378 A1 | 3/1997 |
| WO | 00/79314 A1 | 12/2000 |
| WO | 2006/085690 A1 | 8/2006 |

OTHER PUBLICATIONS

Non-English Search Report dated Jun. 25, 2014 for Taiwan Application No. 102137333 with English translation.
Patent Abstracts of Japan English abstract of JP 2004-252117 A.
Patent Abstracts of Japan English abstract of JP 2003-181869 A.
Patent Abstracts of Japan English abstract of JP 2011-206655 A.
Espacenet English abstract of JP 2005-173417 A.
Espacenet English abstract of WO 2006/085690.
English abstract of TW 566338.
Espacenet English abstract of TW 583414 B.
Espacenet English abstract of CN 1094737 A.
Espacenet English abstract of TW 396111.
Non-English Office Action dated Apr. 23, 2015 with English translation for Korean Application No. 10-2013-0123940.
Non-English Action dated Jun. 24, 2015 for Chinese Application No. 201310484851.
espacenet English abstract of CN 102692660 A.
espacenet English abstract of CN 1350649 A.

* cited by examiner

PROCESS FOR REFLECTIVE PRODUCTS

BACKGROUND OF THE INVENTION

1. Field of the Invention

The present invention relates to a method for preparing a reflective film, and further relates to a method for manufacturing a reflective article, especially, reflective fabric with high reflectivity, by using the prepared reflective film, where the reflective fabric is capable of presenting different colors as required.

2. Description of the Related Art

In the conventional preparation of a reflective article, a reflective agent or fluorescent powder is directly sprayed on a surface of the article. Due to bright colors presented by chemical colorants of the reflective agent itself, or due to chemical properties of the fluorescent powder, people can see dazzling colors with the naked eye. This phenomenon is generally referred to as a "reflective effect." However, the colorant such as the reflective agent is adhered to the surface of the article due to the addition of an adhesive or a hardener, and the sprayed agent is unevenly distributed in thickness. The material of the reflective matter is a soft adhesive layer or paint layer. Therefore, after such a layer is repeatedly wiped and abraded over long-term use, the reflective agent layer gradually attenuates. Moreover, as the reflective agent layer is often exposed to sunlight and moisture, it also gradually fades or deteriorates, resulting in deterioration of the reflective effect. Hence, such a reflective article has a disadvantage of failing to sustain its reflective effect over time.

Small glass particles are also used in the industry to manufacture a reflective surface of a reflective article. Development of and advancements in synthetic resin and technology in other fields have given rise to reflective films manufactured with glass particles, synthetic resin, films with metal, and coating technologies. Reflective fabrics are developed on the basis of oriented reflective films with the development of synthetic resins and according to the demand of developing society.

Serving a role in safety and various practical applications, reflective fabrics are already widely used in outdoor work clothes for special industries such as transportation, sanitation, and public security. Wearing or carrying reflective materials enables workers to be seen by drivers from a long distance due to the retroreflective function of the reflective materials, thereby preventing accidents. The safety of ordinary persons engaging in activities at night can also be enhanced by reflective fabric applied to clothes, shoes, hats, bags, or raingear. The degree to which safety is enhanced is measured according to reflective strength of the reflective fabric. The higher the reflectivity, the more conspicuously visible the article, which thus becomes easier for drivers to spot, and from a longer distance. In addition to its reflective properties, reflective fabric designed for safety and other functional applications in clothing should be designed to feature properties that facilitate long-term use, such as being washable, wear-resistant, and waterproof.

A method for manufacturing a reflective article in the prior art is shown in FIG. 1, in which silver paste 2 is doped and mixed with emulsion, and then the mixture is coated on a substrate 1 (for example, fabric, paper, or a plastic sheet) to be overlaid, and finally, glass particles 3 are directly coated and scattered on the adhesive emulsion, thereby completing the manufacturing. However, the reflective article in the prior art can merely present the color silver.

Therefore, there is still a need to develop a reflective article that is capable of reflecting different colors while featuring desired properties such as being washable, wear-resistant, waterproof, inexpensive to prepare, and applicable to various substrates (especially fabrics).

SUMMARY OF THE INVENTION

In view of the above, the present invention provides a method for preparing a reflective film, so as to solve the foregoing problems. The method of the present invention comprises the following steps:

(a) providing a first substrate, and forming a releasable adhesive layer thereon;

(b) applying reflective particles onto the releasable adhesive layer, where the reflective particles are partially embedded in the releasable adhesive layer;

(c) applying a pigment onto the reflective particles and the releasable adhesive layer;

(d) removing a portion of the pigment so that the pigment does not completely cover the reflective particles; and (e) forming a reflective layer on the pigment and the reflective particles.

The present invention also pertains to a method for manufacturing a reflective article, which further comprises the following steps in addition to steps (a) to (e):

(f) providing a second substrate, and enabling the reflective layer obtained through step (e) to be adhered onto the second substrate with a hot glue; and (g) removing the first substrate from the releasable adhesive layer.

The reflective article prepared in the present invention can present the colors of the used pigment when a light source of incident light is weak, and when the light from a strong light source is incident, the reflective article still achieves a high-brightness sliver reflective effect, and presents the colors of the pigment through the surrounding residual light. The reflective article of the present invention takes advantage of the properties of high-refraction retroreflection, and has desirable reflectivity effects. Accordingly, such reflective articles have high visibility, especially at night, while also eliminating reflective dead angles, so that the reflected light can be seen from various angles.

BRIEF DESCRIPTION OF THE DRAWINGS

The invention will be described according to the appended drawings in which.

PREFERRED EMBODIMENT OF THE PRESENT INVENTION

Figure 1:
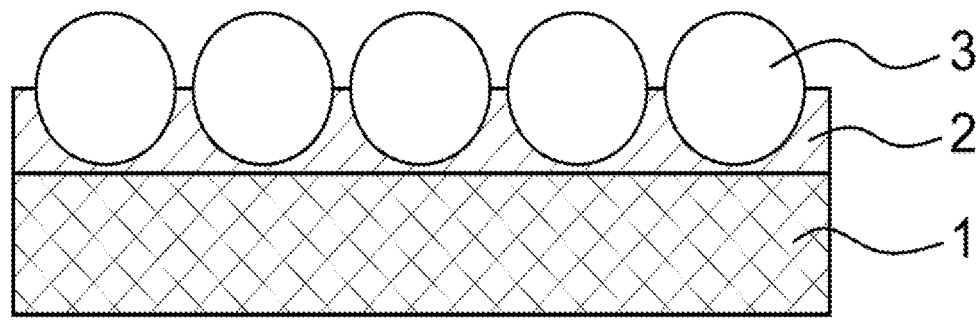
FIG. 1 shows a reflective article in the prior art.
Figure 2:
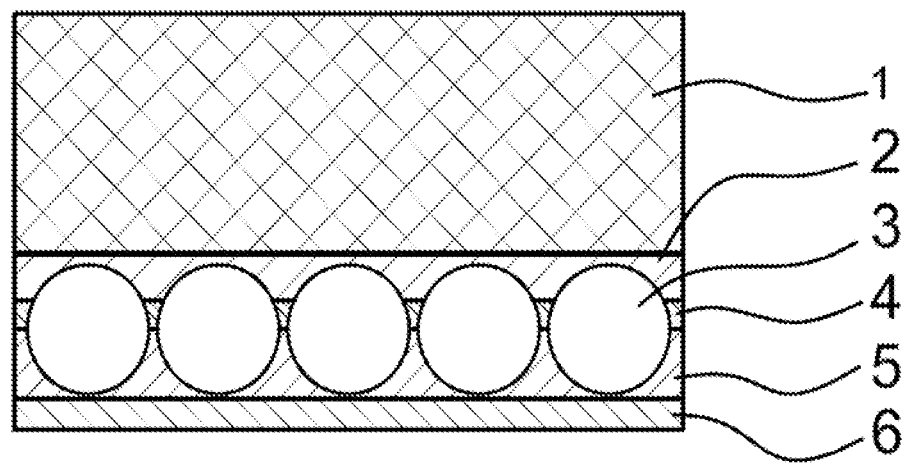
FIG. 2 shows an example of a reflective article of the present invention.

The foregoing steps are further described below with reference to FIG. 2: first, providing a first substrate 6, and forming a releasable adhesive layer 5 thereon; applying reflective particles 3 onto the releasable adhesive layer 5, where the reflective particles 3 are partially embedded in the releasable adhesive layer 5; applying a pigment onto the reflective particles 3 and the releasable adhesive layer 5 to form a pigment layer; removing a portion of the pigment so that the pigment layer 4 does not completely cover the reflective particles 3; forming a reflective layer 2 on the pigment layer 4 and the reflective particles 3; providing a second substrate 1, and enabling the reflective layer 2 to be adhered onto the second substrate 2 through hot glue; and removing the first substrate 6 from the releasable adhesive layer.

A material of the first substrate applicable to the present invention can be, for example, but is not limited to, polyester such as polyethylene terephthalate (PET) or paper.

A material of the releasable adhesive layer applicable to the present invention can include, but is not limited to, polyester resin, polystyrene resin, polyolefin resin, silicone resin, or a combination thereof. According to a preferable embodiment of the present invention, the releasable adhesive layer includes silicone resin.

The reflective particles applicable to the present invention are preferably transparent granules with high refraction, and a material thereof can be, for example, but is not limited to, glass, ceramics, synthetic resin, or a combination thereof. According to a preferable embodiment of the present invention, the reflective particles include glass particles. According to the present invention, a particle size of the reflective particles approximately ranges from 0.05 mm to 0.35 mm, and preferably, ranges approximately from 0.1 mm to 0.2 mm. In the present invention, the reflective particles are applied onto the releasable adhesive layer preferably in a coating manner or an electrostatic arrangement and implanting manner, where the reflective particles are partially embedded into the releasable adhesive layer.

The pigment used in the present invention can absorb light of a specific wavelength, so that the pigment has a single color or more than one color. In addition to the required colorant, the pigment further includes, for example, but is not limited to, polymer or ink. The colorant applicable to the present invention may be any colorant known by persons having ordinary skill in the art. According to a specific embodiment of the present invention, the pigment is a coloring paste including polyurethane. According to the present invention, the pigment thickness of the coated pigment approximately ranges from 0.001 mm to 0.050 mm, and preferably, the thickness approximately ranges from 0.002 mm to 0.010 mm.

The reflective layer of the present invention can reflect the incident light passing through the reflective particles, such that the reflective light enters the reflective particles again. According to the present invention, the reflective layer is formed on the pigment and the reflective particles, and completely covers the reflective particles. The reflective layer may be formed by coating metal powders or by electroplating a metal in vacuum, where the metal is preferably aluminum. According to a specific embodiment of the present invention, the thickness of the formed reflective layer ranges approximately from 0.01 mm to 0.10 mm, and preferably, the thickness ranges approximately from 0.05 mm to 0.08 mm.

According to the method of the present invention, the formed pigment layer does not completely cover the reflective particles. It is found that if the pigment layer completely covers the reflective particles, the light is blocked by the pigment layer, and thereby the light fails to be reflected by the reflective layer.

Hot glue in the present invention is used to enable the reflective layer to adhere to the second substrate. According to a preferable specific embodiment, the hot glue may include polyurethane (PU).

The second substrate applicable to the present invention is not specially limited, and may be determined according to the design of the applied product by a person skilled in the art, and may be, for example, but is not limited to, fabric, glass, metal, plastic, carbon fiber, glass fiber, or a composite formed by the foregoing materials.

In the method of the present invention, the releasable adhesive layer, the pigment layer, and the reflective layer are formed by coating or other manner known by persons skilled in the art. The coating manner includes, for example, but is not limited to: knife coating, roller coating, flexographic coating, thermal transfer coating, micro gravure coating, flow coating, curtain coating, spin coating, spray coating, bar coating, slot die coating, gravure coating, slide coating, or other manners or a combination of the foregoing manners.

In the method of the present invention, the purpose of removing a portion of the pigment is to make the pigment not completely cover the reflective particles. The said portion of the pigment can be removed by a physical method, chemical method or any other manner known in the art, for example, by using a scraper to remove the portion or utilizing a suitable solvent to remove the portion.

According to an embodiment of the present invention, after applying the pigment and prior to removing a portion of the pigment, a suitable pressure may be applied to the reflective particles to allow the particles to be more tightly bonded to the releasable adhesive layer. For example, the pressure may be applied by a press machine, by a method such as calendaring, compaction or roller compaction.

The present invention is further described in detail through specific examples. It should be noted that the examples are merely used to illustrate the present invention, and are not intended to limit the scope of the present invention. Modifications or changes easily made to the present invention by a person with ordinary skill in the art all fall within the scope of the content of the application and the scope of the appended claims.

EXAMPLES

Example 1

Preparation of Reflective Fabric

The reflective fabric of this example is obtained through the following steps:
(a) providing PET, and coating silicone resin thereon;
(b) electrostatically implanting glass particles with a particle size approximately ranging from 0.1 mm to 0.2 mm on the silicone resin, where the glass particles are partially embedded in the silicone resin;
(c) coating polyurethane coloring paste on the glass particles and silicone resin, to form a coating layer with a thickness of about 0.010 mm, then the glass particles coated with the paste are pressed by roller compaction;
(d) using a scraper to remove a portion of the polyurethane coloring paste, controlling the amount to be removed so that the polyurethane coloring paste does not completely cover the reflective particles and the coating layer of the polyurethane coloring paste was reduced to have a thickness of about 0.005 mm;
(e) coating an aluminum powder coating on the polyurethane coloring paste and the glass particles;
(f) providing fabric, and enabling the aluminum powder coating to be adhered onto the fabric through hot glue; and
(g) stripping the PET from the silicone resin.

Example 2

Reflectivity Property Test for the Reflective Fabric

According to the EN471 standard, yellow (using yellow coloring paste) and blue (using blue coloring paste) reflective fabrics prepared through the steps in Example 1 were entrusted with the Automotive Research & Testing Center (ARTC) for a reflectivity property test. In addition, the prepared silvery gray reflective fabric (using silvery gray coloring paste) was entrusted with the Switzerland General Surveillance (SGS) (in Taiwan, this was entrusted with Taiwan Inspection Technology Co., Ltd.) for a reflectivity property test. The aggregated data are shown in the following table:

| | | EN 471 | | | | |
|---|---|---|---|---|---|---|
| | | ARTC | | SGS | | |
| Incident angles | Viewing angles | Measurement values for the yellow reflective fabric (cd/(lx·m²)) | Measurement values for the blue reflective fabric (cd/(lx·m²)) | Measurement values for the silvery gray reflective fabric (cd/(lx·m²)) | Standard values of silver Level 1 (cd/(lx·m²)) | Standard values of silver Level 2 (cd/(lx·m²)) |
| 5° | 12' | 257 | 128.2 | 158 | 250 | 330 |
| | 20' | 215 | 109.1 | 134 | 120 | 250 |
| | 1°(0°) | 24.1 | 15.4 | 25.4 | 25 | 25 |
| | 1°(90°) | 23.3 | 16.4 | 21.4 | 18.75 | 24 |
| | 1°30' | 10.8 | 6.2 | 8.3 | 10 | 10 |
| 20° | 12' | 197 | 80.1 | 99.7 | 220 | 290 |
| | 20' | 170.1 | 71.2 | 89.5 | 100 | 200 |
| | 1° | 33.5 | 20.5 | 22.4 | 15 | 15 |
| | 1°30' | 11.9 | 7.8 | 9.9 | 7 | 7 |
| 30° | 12'(ε = 0°) | 114.3 | 35.3 | 67 | 135 | 180 |
| | 12'(ε = 90°) | 118.6 | 41.1 | 44.7 | 101.25 | 179 |
| | 20'(ε = 0°) | 103.3 | 32.5 | 57.6 | 75 | 170 |
| | 20'(ε = 90°) | 107.1 | 37 | 40.3 | 56.25 | 170 |
| | 1° | 32.3 | 13.7 | 15.8 | 12 | 12 |
| | 1°30' | 12.5 | 6.7 | 8 | 5 | 5 |
| 40° | 12'(ε = 0°) | 49.1 | 10.8 | 35.2 | 50 | 65 |
| | 12'(ε = 90°) | 51.8 | 14.7 | 17.5 | 37.5 | 65 |
| | 20'(ε = 0°) | 45.8 | 10.2 | 28.8 | 30 | 60 |
| | 20'(ε = 90°) | 48.2 | 13.5 | 15.7 | 22.5 | 60 |
| | 1°(ε = 0°) | 20.6 | 5.5 | 9.8 | 10 | 10 |
| | 1°(ε = 90°) | 21.1 | 6.1 | 8 | 7.5 | 10 |
| | 1°30' | 9.8 | 3.3 | 4.9 | 4 | 4 |

It can be found from the data that the reflective fabric of the present invention has superior reflectivity properties, in particular as evidenced by reflectivity data are associated with bottom colors. The larger the viewing angle is, the further the measurement value exceeds the standard value. In addition, the reflective fabric prepared according to the present invention is characterized by presenting lively colors; during the day, visual disturbance (that is, reflected light that causes visual discomfort) is avoided, while a sufficient reflective effect for security purposes is achieved in a dim environment or at night.

What is claimed is:

1. A method for preparing a reflective film, comprising the following steps:
    (a) providing a first substrate, and forming a releasable adhesive layer thereon;
    (b) applying reflective particles onto the releasable adhesive layer, wherein the reflective particles are partially embedded in the releasable adhesive layer;
    (c) applying a pigment onto the reflective particles and the releasable adhesive layer;
    (d) removing a portion of the pigment so that the pigment does not completely cover the reflective particles; and
    (e) forming a reflective layer on the pigment and reflective particles.

2. A method for preparing a reflective article, comprising steps (a) to (e) according to claim 1, and further comprising the following steps:
    (f) providing a second substrate, and enabling the reflective layer formed through step (e) to be adhered onto the second substrate with a hot glue; and
    (g) removing the first substrate from the releasable adhesive layer.

3. The method according to claim 2, wherein the second substrate is fabric.

4. The method according to claim 1, further comprising the following step between the steps (c) and (d): applying a pressure on the reflective particles.

5. The method according to claim 1, wherein the first substrate comprises polyethylene terephthalate (PET).

6. The method according to claim 1, wherein the reflective particles comprise glass particles.

7. The method according to claim 1, wherein the pigment comprises polyurethane coloring paste.

8. The method according to claim 1, wherein the reflective layer comprises aluminum.

9. The method according to claim 1, wherein the reflective particles are applied onto the releasable adhesive layer in an electrostatic implanting manner.

* * * * *